United States Patent
Di Profio

(10) Patent No.: US 6,973,532 B2
(45) Date of Patent: Dec. 6, 2005

(54) MEMORY ARCHITECTURE FOR DIALOGUE SYSTEMS

(75) Inventor: Ugo Di Profio, Fellbach (DE)

(73) Assignee: Sony International (Europe) GmbH, Berlin (DE)

( * ) Notice: Subject to any disclaimer, the term of this patent is extended or adjusted under 35 U.S.C. 154(b) by 423 days.

(21) Appl. No.: 10/235,434

(22) Filed: Sep. 5, 2002

(65) Prior Publication Data

US 2003/0051096 A1   Mar. 13, 2003

(30) Foreign Application Priority Data

Sep. 7, 2001   (EP) .................................. 01121473

(51) Int. Cl.⁷ ............................................. G06F 12/00
(52) U.S. Cl. .................. 711/111; 711/125; 711/154; 704/201; 704/231; 710/3
(58) Field of Search .................. 711/111, 125, 154; 704/201, 231; 710/3

(56) References Cited

U.S. PATENT DOCUMENTS

| | | | | |
|---|---|---|---|---|
| 5,540,589 A | * | 7/1996 | Waters | 434/156 |
| 5,774,860 A | * | 6/1998 | Bayya et al. | 704/275 |
| 5,797,123 A | * | 8/1998 | Chou et al. | 704/256 |
| 5,819,039 A | * | 10/1998 | Morgaine | 709/217 |
| 5,881,312 A | | 3/1999 | Dulong | 710/7 |
| 6,311,159 B1 | * | 10/2001 | Van Tichelen et al. | 704/275 |
| 6,418,440 B1 | * | 7/2002 | Kuo et al. | 707/10 |
| 6,647,363 B2 | * | 11/2003 | Claassen | 704/1 |
| 6,745,161 B1 | * | 6/2004 | Arnold et al. | 704/7 |
| 2002/0198707 A1 | * | 12/2002 | Zhou | 704/231 |
| 2003/0125926 A1 | * | 7/2003 | Claassen | 704/1 |

FOREIGN PATENT DOCUMENTS

| | | | |
|---|---|---|---|
| DE | 100 14 448 | 11/2000 | G06F 15/173 |
| EP | 0 911 783 | 4/1999 | G08G 1/0968 |

OTHER PUBLICATIONS

European Search Report dated Feb. 18, 2002 for priority document European Patent Application No. (EPO) 01 121 473.1, pp 1-3.*

* cited by examiner

Primary Examiner—Stephen C. Elmore
(74) Attorney, Agent, or Firm—Frommer Lawrence & Haug LLP; William S. Frommer; Samuel S. Lee

(57) ABSTRACT

A dialogue system (8) comprises a plurality of memory units (4) each of which is able to store an information unit and at least one logical connection between two or more of said memory units (4). An information unit is stored in one memory unit (4) at the time of occurrence of the information unit, and at least one logical connection to at least one other memory unit (4) is assigned to said memory unit (4) after storage of the information unit and said at least one logical connection is stored in said memory unit (4).

12 Claims, 3 Drawing Sheets

MEMORY ARCHITECTURE FOR DIALOGUE SYSTEMS

Figure 1:
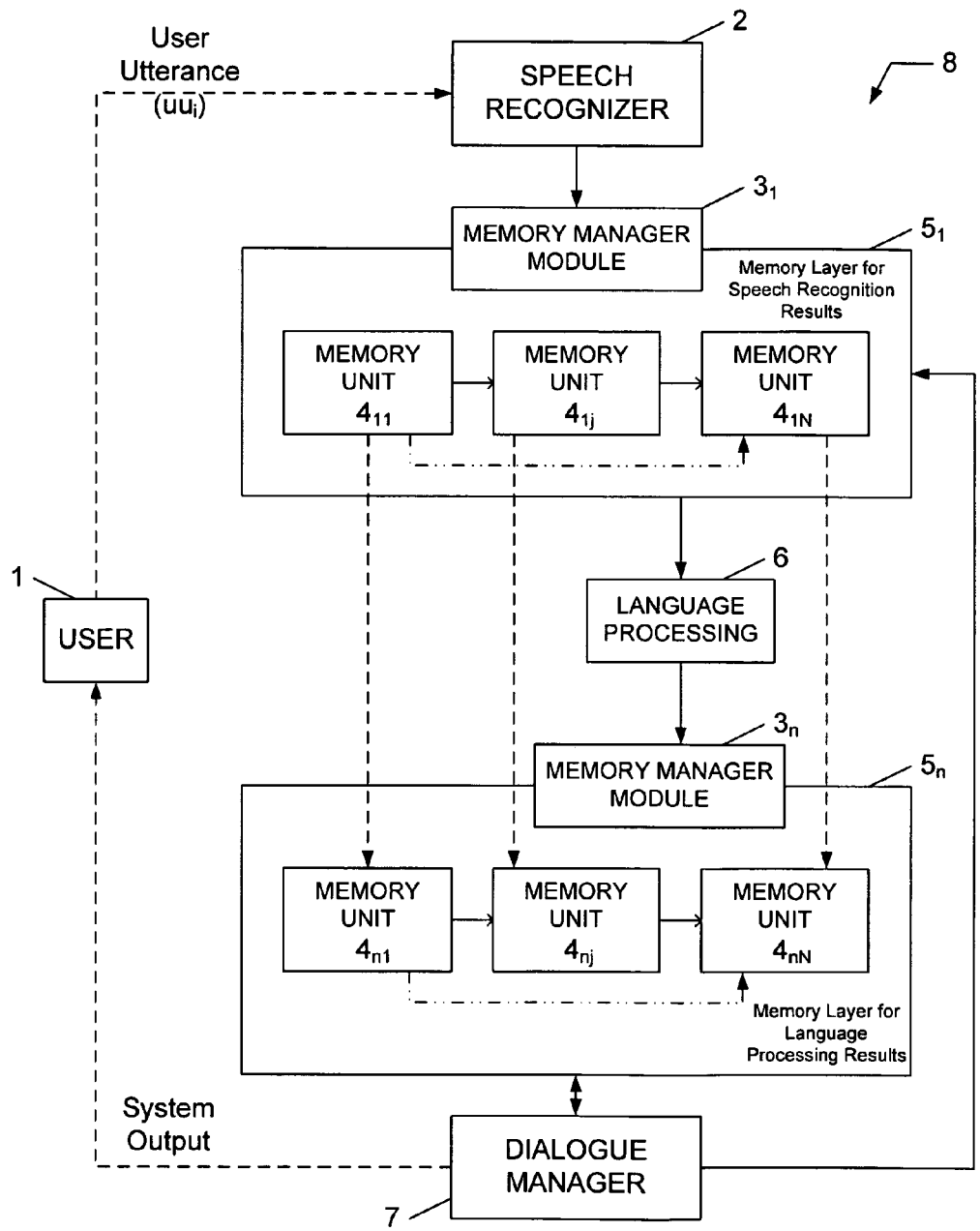

The present invention relates to a dialogue system, in particular to a memory architecture thereof, and a memory management method within a dialogue system.

Dialogue systems are usually task oriented, i. e. specialized for a specific application. Dialogue management and dialogue memory are designed and implemented according to the task. The dialogue management is typically modelled as a finite state machine wherein inputs of a user or actions of the system trigger transitions from state to state. Each state defines a specific context. The dialogue management is implemented locally in the given state and is limited to the functionality predefined for the context which the state models. The dialogue memory is implemented using data structures to store information exchanged during the dialogue which is relevant for the task and also to store additional information about the overall system status.

For example, to store information exchange during the dialogue that is relevant for the task, a dialogue system specialized on the task of providing time schedules for trains might use only one table to store all the information relevant for the task, e. g. departure location, destination, departure and/or arrival time, as a data structure similar to existing time tables.

Since such task oriented dialogue systems which are limited to provide specific services implement a dialogue memory that is tightly related to the specific task, i. e. only store information that is sufficient to perform the task in a given state, it is likely that information which is not input in a predefined order, i. e. information that should be input in another state, is missed and the system needs to ask for this information again even though it was already input by the user.

Therefore, it is the object underlying the present invention to enhance existing dialogue systems in view of their memory structure and memory management so that all input and/or output information can be properly processed.

According to the present invention a dialogue system comprises a plurality of memory units each of which is able to store an information unit and at least one logical connection between said memory unit and at least one other of said memory units.

The memory management method within a dialogue system according to the present invention comprises the steps of storing an information unit in one memory unit at the time of occurrence of the information unit, and assigning at least one logical connection to at least one other memory unit to said memory unit after storage of the information unit and storing said at least one logical connection in said memory unit.

Therefore, according to the present invention, provisions are given to store the whole of the information exchanged during the dialogue by both parties, i. e. by the user and by the system itself.

Examples of such logical connections are historical positions in the dialogue, speech input of a certain user, actual/estimated semantic content of the memory unit, and/or specific user inputs to specific system output. Each memory unit might store several logical connections, e.g. one according to its historical position in the dialogue and one other according to the user input to system output relation. The logical connections might e.g. be pointers to the preceding and/or succeeding memory units or pointers to an index defining the respective interrelationship.

An information unit is preferably a "single piece of information", i.e. the information exchanged at each turn of the dialogue, produced either by the user or by the system, e.g. the sentence uttered by the user or the action performed by the system, or more general a user input or a system output.

As a result, it is possible to process several different information units which are contained in user inputs even if these information units are not input in a proper predefined order and at the proper time. Therefore, complex dialogue systems, e. g. conversational systems, and their implementation are supported by the dialogue system and the memory management method according to the present invention.

The dialogue system according to the present invention preferably comprises at least one memory manager module which is respectively adapted to manage at least one group of logically connected memory units. Therewith, a memory manager module can e.g. manage the whole memory units of the dialogue system or several memory manager modules might be provided each of which is responsible for one or more groups of memory units.

Further preferably, a memory manager module is adapted to store a definition of the content of each managed group of memory units and/or to store a definition of the content of at least one memory unit of each managed group of memory units.

Alternatively or additionally a memory manager module might store a logical connection to the first and/or a logical connection to the last logically connected memory units of each managed group of memory units. To browse a respective group of logically connected memory units (which might be regarded as a memory net) the logical connections from one memory unit to the preceding or succeeding memory unit might be followed from one memory unit to the other. However, also other embodiments like an index to define a memory net are possible.

Preferably, one or more of the memory units are clustered in a memory layer (software layer) which comprises a group of one or more logically connected memory units and which is assigned to a processing stage (dialogue state) of the dialogue system. Such processing stages of the dialogue system could e. g. be the key stages in the processing of user inputs and system outputs. A processing stage might be regarded to represent a step in the processing of the specific modality considered in the input of the user. Preferably in each memory layer homogeneous information is stored. In such an organization, memory nets might comprise intra layer links, e.g. corresponding to links of memory units in one memory layer, and cross layer links e.g. corresponding to links of memory units storing the same historical user input or system output information, but in different layers, e.g. in different processing stages.

Further preferably, according to the present invention, preferably a memory manager module is provided for each of said at least one memory layer which memory manager module is respectively adapted to manage the respective corresponding memory layer.

The memory management method according to the present invention preferably additionally comprises the step of defining a content of a group of logically connected memory units and managing said content in a memory manager module.

The memory management method according to the present invention further preferably additionally comprises the step of storing a logical connection to the first and/or a logical connection to the last logically connected memory units of each managed group of memory units in a memory manager module.

Therefore, according to the present invention, e.g. as the dialogue proceeds, a better specification of the context and of the goals of the user may be available to the system and then previous user's inputs can be reprocessed and/or previous system's actions can be reprocessed and or previous system's actions can be revised according to the structure given in one or more memory nets. Also, it could be possible to avoid to re-ask questions to the user if missing information can be retrieved from previous inputs when, later on in the course of the dialogue, new knowledge has been acquired from other inputs. Also, memories can be stored and used across several dialogues and then used to build and maintain a proper user profile for a better adaptation of the system to each user's preferences.

Figure 2:
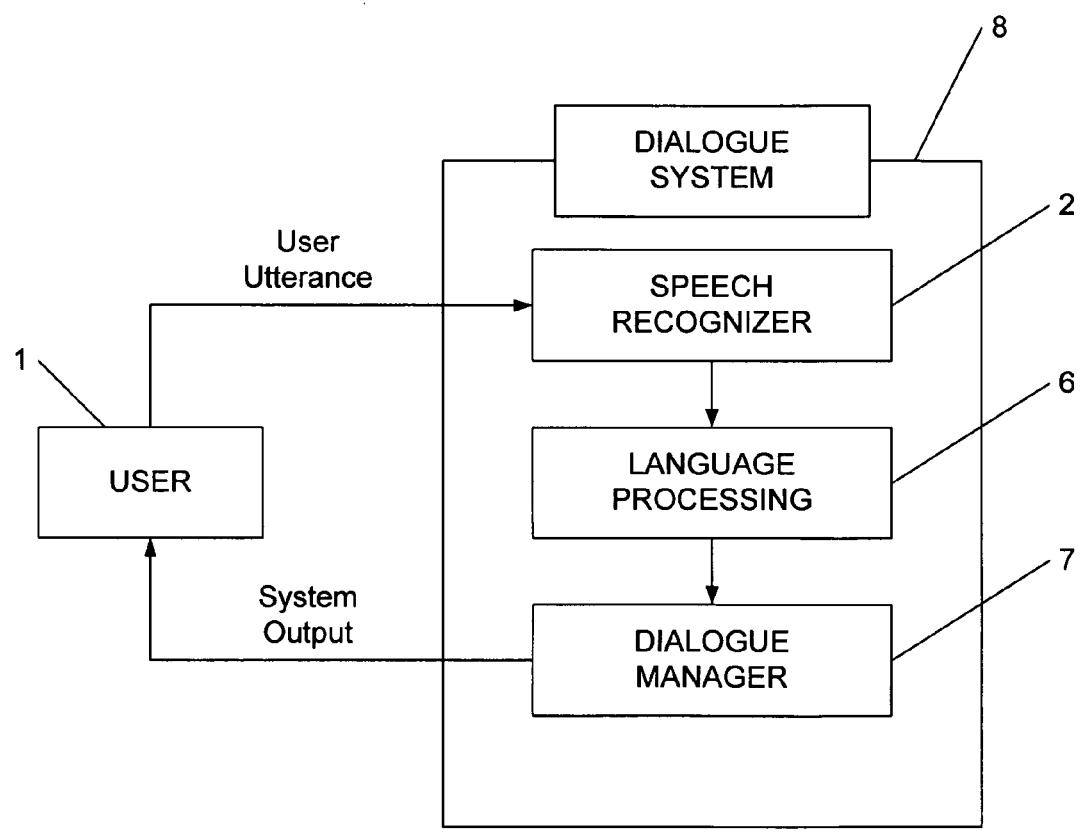

Further features and advantages of the dialogue system and the memory management method within a dialogue system according to the present invention will become apparent from the following description of an exemplary embodiment thereof taken in conjunction with the accompanying figures, wherein FIG. 1 shows a block diagram of a dialogue system with the memory architecture for user's inputs according to the present invention; and FIG. 2 shows a block diagram of a simplified general dialogue system.

Figure 3:
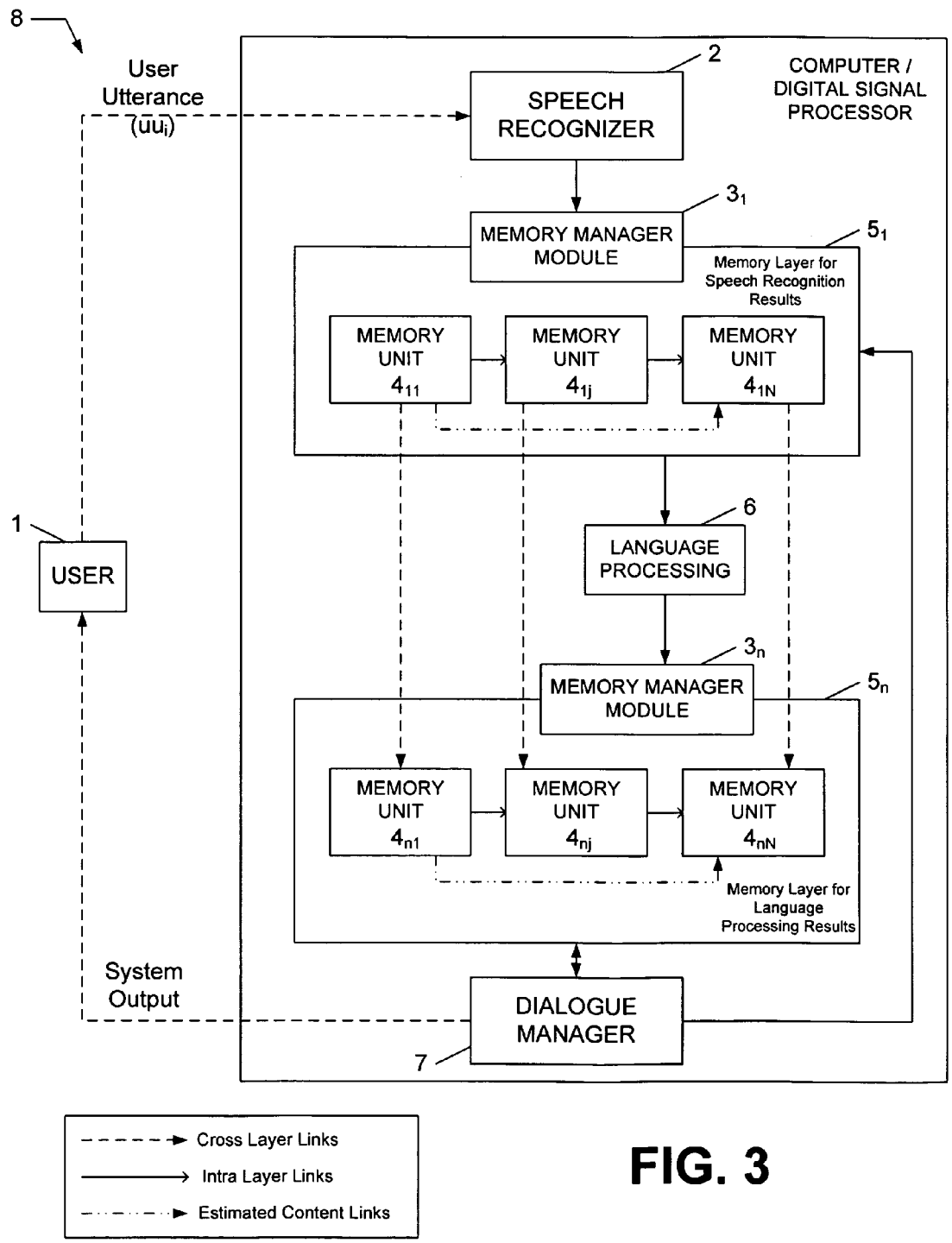

FIG. 3 shows a block diagram of an alternative embodiment of FIG. 1.

The typical dialogue system 8 shown in FIG. 2 comprises a speech recognizer 2 which receives user inputs, in this embodiment speech inputs, and supplies its results to a language processing unit 6. The language processing unit 6 interprets the recognized user inputs and provides its results to a dialogue manager 7 which provides system outputs to the user 1.

The shown dialogue system is based on a speech input, but—of course—not limited thereto. Alternatively or additionally a textual input or any other input possibility might be used. In such a case a corresponding "user input" recognizer has to be implemented instead of or additionally to the speech recognizer 2. Further, the system output could be supplied to the user in any desired form, e.g. textual, as speech output, tactile, etc.

The dialogue system 8 according to the present invention which is shown in FIG. 1 additionally comprises memory units 4 which are arranged in memory layers 5 which are managed by memory manager modules 3. In particular, a first memory layer $5_1$ is provided between the speech recognizer 2 and the language processing unit 6 and a further memory layer $5_n$ is shown between the language processing unit 6 and the dialogue manager 7.

The first memory layer $5_1$ is managed by a corresponding first memory manager module $3_1$ and comprises N memory units $4_{11}$ to $4_{1N}$, N being a positive integer, three of which are shown in FIG. 1, namely a first memory unit $4_{11}$, a $j^{th}$ memory unit $4_{1j}$ and a $N^{th}$ memory unit $4_{1N}$.

The further memory layer $5_n$ comprises a further manager memory module $3_n$ and N memory units $4_{n1}$ to $4_{nN}$, three of which are shown in FIG. 1, namely a first memory unit $4_{n1}$, a $j^{th}$ memory unit $4_{nj}$, and a $N^{th}$ memory unit $4_{nN}$.

The first and the further memory layer $5_1$, $5_n$ are only exemplary shown for all n memory layers, n being a positive integer, which might be arranged at different stages of the dialogue system 8, e. g. additionally to the shown first and further memory layer $5_1$, $5_n$ between the speech recognizer 2, the language processing unit 6, and the dialogue manager 7. Generally, memory layers might be arranged between or after processing modules that define processing stages of the dialogue system and store a partial result of the processing, Also, the number of memory units 4 within the different memory layers 5 need not necessarily to be equal.

In the shown example, the first memory layer $5_1$ is used as a memory layer for speech recognition results and the further memory layer $5_n$ is used as a memory layer for language processing results. The memory units within a respective memory layer are logically linked by intra layer links, e. g. according to the historical position of an information unit stored in the respective memory unit in the dialogue. Exemplary, the first memory unit $4_{11}$ of the first memory layer $5_1$ is linked to the $j^{th}$ memory unit $4_{1j}$ of the first memory layer $5_1$ which is linked to the $N^{th}$ memory unit $4_{1N}$ of the first memory layer $5_1$. Similar, the first memory unit $4_{n1}$ of the further memory layer $5_n$ is linked to the $N^{th}$ memory unit $4_{nj}$ of the further memory layer $5_n$ which is linked to the $N^{th}$ memory unit $4_{nN}$ of the further memory layer $5_n$.

In both shown memory layers $5_1$, $5_n$ additional memory units 2 ... j–1 might be arranged between the first memory unit $4_{x1}$ and the $j^{th}$ memory unit $4_{xj}$ and additional units j+1 ... N–1 might be arranged between the $j^{th}$ memory unit $4_{xj}$ and the $N^{th}$ memory unit $4_{xN}$ for every memory layer $5_x$ with x=1 ... n. These memory units are then linked in their numerical order (=historically) via intra layer links to the shown first, $j^{th}$, and $N^{th}$ memory units $4_{x1}$, $4_{xj}$, $4_{xN}$.

Further, the shown memory units are logically connected between different memory layers via cross layer links, here for example respectively the first memory units $4_{11}$, $4_{n1}$, the $j^{th}$ memory units $4_{1j}$, $4_{nj}$ and the $N^{th}$ memory units $4_{1N}$, $4_{nN}$ since for example the speech recognition results within the memory units of the first memory layer $5_1$ correspond (historically) to the information units stored as a result of the language processing unit 6 in the corresponding memory units of the further memory layer $5_N$. Of course, these logical connections need not to be only between memory units having corresponding numbers, i. e. between the first memory units, the $j^{th}$ memory units and the $N^{th}$ memory units, but—depending on the respectively stored information unit—might also be established between e. g. the first memory unit $4_{11}$ of the first memory layer $5_1$ and the $j^{th}$ memory unit $4_{nj}$ of the further memory layer $5_n$ in case these memory units correspond (e. g. historically) to each other.

Furthermore, estimated content links are established between several memory units within one memory layer 5, in the shown example the first and $N^{th}$ memory units $4_{x1}$, $4_{xN}$ of a memory layer 5, but—as in case of the shown cross layer links—estimated content links might be established also between different layers and other than the shown memory units. Also, longer chains of memory units 4 might be built and the estimated content links might be different in each memory layer 5.

In the following a more detailed description of the memory architecture according to the present invention which is exemplary shown in FIG. 1 will be given. In this description no detailed references will be given to the number of a memory layer or a memory unit therein where appropriate, instead—as also used in the above description—general references to one or more memory layer(s) 5 and one or more memory unit(s) 4 will be given.

As indicated above, the memory architecture is defined in term of storage units, i. e. memory units 4, of memory layers 5, and of several different logical connections among those memory units 4. These logical connections are indicated as a respective memory net. Memory units 4 store the actual information exchanged during the dialogue and memory layers contain memory units sharing the same representation of information, i. e. information at a specific stage of processing. Memory nets organize the memory units from several different viewpoints, e. g. memory units are organized in a time line.

In principle, the whole dialogue memory could be managed by one memory manager module on which all other components of the dialogue system rely for memory access: that organization could be considered as a one-layer structure. Having several different memory layers and separate corresponding memory manager modules helps in organizing and simplifying the overall memory structure and also helps in implementing a proper memory access policy; e.g. the language processor unit 6 would not be given access rights to the memory layer storing e.g. signal processing information.

According to the exemplary embodiment of the present invention the dialogue system 8 is provided with memory units 4 for two key stages of the dialogue system 8. These memory units 4 are organized appropriately in one memory layer 5 for each key stage. Here, the key stages are the speech recognizer 2 and the language processing unit 6.

Depending on the modalities used by the dialogue system different stages might be identified for user input key stages. For example, in a spoken language dialogue system, the key stages might be chosen as depicted in FIG. 2. More in general, each stage represents a step in the processing of the specific modality considered in the user's input. Typically, the processing is comprised of e. g. acquisition, analysis, recognition and understanding stages.

Depending on the specific architecture and on the type of the system also different stages can be identified for system outputs. For example, in a task oriented system, the only stage could be the association of the user's input to a system action. Using memory units 4 for such a stage, the system is able to "remember" what it did in response to a specific user's input. This information can be helpful in the continuation of the dialogue.

As indicated before, a memory layer 5 is provided for each of the processing stages. Each memory layer 5 comprises several memory units 4, each of which contains a single piece of information, e. g. a user's input (e. g. an utterance) or a system output (e. g. an action). Each memory layer 5 contains homogenous information, e. g. memory units 4 in the first memory layer $5_1$ used in the stage between the speech recognizer 2 and the speech understanding module, i. e. the language processor 6, store word graphs as resulting from the speech recognition process.

Each time a new memory unit 4 is added to a memory layer 5, it is logically "connected" to other existing memory units 4 and thus it is logically inserted into at least one memory net, e. g. the one representing the time line. In general, each memory unit 4 is logically inserted into several different memory nets according to the memory layer it belongs to and to the dialogue management strategy. In particular, the memory unit 4 is normally not duplicated and physically inserted into several memory nets; only connections, e.g. pointers, to other memory units are created. The first memory unit $4_{x1}$ of a memory layer 5 is not necessarily logically connected to other existing memory units 4 after an information unit is stored therein.

As shown in FIG. 1 and indicated before, a memory net can link together memory units 4 belonging to the same memory layer 5 as well as memory units 4 belonging to different memory layers 5.

Each memory layer 5 might be accessed by the modules of the dialogue system, e. g. the speech recognizer 2, the language processing unit 6, and the dialogue manager 7, which pertain to the corresponding stage of processing only. For example, the dialogue manager 7 might have access to all of the memory layers 5, while the language processor unit 6 would have access to the first memory layer $5_1$, e. g. to linguistic user input only which is output from the speech recognizer 2. Of course, in a multimodal dialogue system, it could be convenient for the language processing unit 6 to access the other memory layers as well.

For the proper management of memory which is considered as a resource for the system, according to the shown embodiment of the present invention each memory layer 5 is managed by a memory manager module 3. The structure of a memory manager module 3, e. g. the code to implement a memory manager module 3 in software, might be unique and it can be configured to handle all kind of layers, i. e. when the system operates each memory manager module 3 is instatiated and different parameters are used to configure each memory manager module 3 for the specific content to be stored at that stage in the corresponding memory layer 5. In other words, each memory manager module 3 knows about the content of the memory layer 5 it is managing and, if required, proper validation of service requests can be performed. For example, the memory manager might be implemented as a class in an object oriented language and each memory manager module will then be instatiated as an object of that class.

The configuration of a memory manager module 3 consists of the definition of the content of the memory layer 5 (and/or of its memory units 4). Once a memory manager module 3 is configured, it can properly recognize, validate and serve requests coming from the modules comprised in the dialogue system. For example, a memory manager module 3 which is configured for a word graph would reject access requests coming from the speech recognizer 2, since the speech recognizer 2 is only supposed to provide data to be stored into that memory layer.

As mentioned before, each memory layer 5 might be accessible to modules which pertain to that corresponding stage of processing only. Therefore, a memory manager module 3 is able to validate access requests to the corresponding memory layer 5.

Also, memory manager modules 3 are able to provide other services, e. g. duplicating memory units 4, searching the memory layer 5 for memory units 4 satisfying specific criteria, e. g. memory units 4 storing similar information, making and updating connections among memory units 4 etc. In other words, a memory manager module 3 is responsible for creating and giving access to memory units 4 as well as for maintaining the memory net within one memory layer 5. A part of the maintenance of the memory net is autonomously performed by the memory manager module 3, a part of it may be requested and instructed by other modules, e. g. the dialogue manager module 7 of the dialogue system 8. For example, the organization of memory units 4 into a time line can be carried out autonomously, while the organization of memory units 4 according to e. g. semantic content might be driven by the dialogue manager 7.

In the following different possible structures of memory nets are exemplary elucidated.

In general, the content of the memory should be structured and organized with respect to the dialogue history and the context in order to make the dialogue memory usable and effective. In other words, memory units 4 must allow a proper identification and interconnection to be used in an effective way.

In particular, each memory unit 4 is logically connected to other memory units 4 which are related to it. As mentioned before, several different connections among (the same) memory units 4 can be defined each of which is called a memory net. Since a memory net is defined in terms of connections between memory units, a memory net can be arbitrarily defined. Nevertheless, not all memory nets are meaningful or relevant for the purpose of dialogue management. As an example, the following connection strategies (relationships), i. e. memory nets, could be applied:

Historical position in the dialogue (raw history graph) as a temporal relationship among memory units 4. The resulting collection of memory units 4 can be seen as a graph whose structure follows that of the history of the dialogue.

Cross stages (layers) connection. Memory units 4 belonging to different memory layers 5 which all pertain to the same, e. g. user speech input may be connected to each other. For example, as shown in FIG. 1, given the user utterance $uu_i$, the $j^{th}$ memory unit $4_{1j}$ in the first memory layer $5_1$, here the memory layer for word graph, will contain the word graph $wg_i$ which was produced by the speech recognizer 2 for the utterance $uu_i$. E. g. the $j^{th}$ memory unit $4_{nj}$ in the further memory layer $5_n$, here the memory layer for concept graph, will contain the concept graph $cg_i$ which the natural language processor 6 has produced for the word graph $wg_i$. Therefore, $j^{th}$ memory units $4_{1j}$, $4_{nj}$ are connected with a cross layer link (and so on for subsequent stages, if any).

Actual/estimated semantic content of the memory unit. Memory units 4 are connected according to the semantic content of information stored therein. For example, all memory units 4 containing a particular (set of) concept(s) could be connected. Using such a memory net, the system can profitably use its memories, e. g. the system could access only those memory units 4 which are expected to contain relevant information with respect to the ongoing processing, e. g. anaphora resolution. Other kinds of contents, e. g. key words can also be considered.

User input to system output connections. Memory units 4 storing user inputs are connected to memory units 4 storing system outputs generated as response to the given user inputs. For example, using such a memory net, the system can possibly reconstruct the whole interaction history.

Several other memory nets can be created and maintained in order to organize the memory units 4 according to several and different type of analyzer view-points and depending on the dialogue management strategies.

As mentioned before, the exemplary embodiments and examples given above refer to a spoken dialogue system, but the memory architecture according to the present invention can also be used in multi-model dialogue systems and dialogue management.

Therefore, according to the present invention a memory architecture for dialogue systems is proposed which preferably adds at least one memory layer 5 at everyone of several key stages of a dialogue system, for both, input of the user and replies and requests of the system. Each memory layer can be selectively activated or not. Such a architecture can provide a comprehensive dialogue history and then give the proper support for the implementation of complex dialogue systems. Each memory layer 5 normally comprises several memory units 4 each of which stores an information unit e. g. in form of a single piece of information. The memory units 4 of one or more memory layers 5 are logically linked via at least one memory net. A memory net is preferably managed by a memory manager module and a memory manager module can preferably manage more than one memory net.

What is claimed is:

1. Dialogue system (8) comprising:
   input means (2) for receiving dialogue information supplied by a user (1);
   output means (7) for providing dialogue information to said user (1);
   a plurality of memory units (4) for storing said dialogue information,
   wherein during a dialogue with a user, the dialogue system (8) passes through several dialogue states, and
   wherein, in each dialogue state, an information unit comprising dialogue information generated by said user (1) and/or the dialogue system (8) in said dialogue state is stored in one of said plurality of memory units (4); and
   assigning means for assigning each memory unit (4) pointing information linking the respective memory unit (4) to at least one other memory unit (4), said pointing information being stored in the memory unit (4) to which said pointing information is assigned.

2. Dialogue system (8) according to claim 1, characterized by
   at least one memory manager module (3) for managing at least one group of logically connected memory units (4), respectively.

3. Dialogue system (8) according to claim 2, characterized in that each memory manager module of said least one memory manager module (3) stores an index of the content of each managed group of memory units (4).

4. Dialogue system (8) according to claim 2, characterized in that each memory manager module of said at least one memory manager module (3) stores an index of the content of at least one memory unit (4) of each managed group of memory units (4).

5. Dialogue system (8) according to claim 2, characterized in that a memory manager module (3) stores pointing information pointing to the first and/or a pointing information pointing to the last logically connected memory units (4) of each managed group of memory units (4).

6. Dialogue system (8) according to claim 1, characterized by
   at least one memory layer (5) which comprises
   a group of one or more logically connected memory units (4), and each of which memory layers (5) is assigned to a processing stage of the dialogue system (8).

7. Dialogue system (8) according to claim 6, characterized by
   a memory manager module (3) for each of the memory layers (5).

8. Memory management method within a dialogue system (8), comprising:
   receiving dialogue information supplied by a user (1);
   providing dialogue information to said user (1);
   storing said dialogue information in a plurality of memory units (4),
   wherein during a dialogue with a user (1), the dialogue system (8) passes through several dialogue states, and
   wherein, in each dialogue state, an information unit comprising dialogue information being created by said user (1) and/or the dialogue system (8) in said dialogue state is stored in one of said memory units (4);

assigning to each memory unit (4) pointing information linking a memory unit (4) to at least one other memory unit (4); and storing said pointing information in the memory unit (4) to which said pointing information is assigned.

9. Memory management method according to claim 8, characterized by the step of:

defining a group of logically connected memory units (4); and managing the information unit stored therein in a memory manager module (3).

10. Memory management method according to claim 9, characterized by the step of:

storing pointing information pointing to the first and/or pointing information pointing the last logically connected memory units (4) of each managed group of memory units (4) in a memory manager module (3).

11. Computer readable storage medium, having stored thereon program code for embodying a dialogue system, comprising:

wherein during a dialogue with a user, the dialogue system (8) passes through several dialogue states, and wherein, in each dialogue state, an information unit comprising dialogue information generated by said user (1) and/or the dialogue system (8) in said dialogue state is stored in one of a plurality of memory units (4); and assigning means for assigning each memory unit (4) pointing information linking the respective memory unit (4) to at least one other memory unit (4), said pointing information being stored in the memory unit (4) to which said pointing information is assigned, when said program code is executed on a computer or a digital signal processor.

12. Computer readable storage medium, having stored thereon program code for performing the method as defined in claim 8 when said computer program is executed on a computer or a digital signal processor.

* * * * *